Dec. 4, 1962

G. A. LOUIS 3,066,544

SPEED VARIATORS

Filed April 19, 1960

Inventor:
Gérard Alexy Louis

United States Patent Office 3,066,544
Patented Dec. 4, 1962

3,066,544
SPEED VARIATORS
Gerard Alexis Louis, 16 Ave. Anatole France,
Clichy-sur-Seine, France
Filed Apr. 19, 1960, Ser. No. 23,340
1 Claim. (Cl. 74—200)

The invention relates to improvements in mechanisms comprising two coaxial curvilinear cones of revolution, and, contacting them under pressure, intermediate discs of revolution whose axis situated in substantially radial planes are tilted in that plane to displace the points of contact of the cones and the discs on both elements and consequently to provide the variation of speed of the driven cone.

In such mechanisms the pressure at the contacting points of the cones and the discs must be sufficient to transmit the tangential force; too much pressure however causes losses of power and reduces the capacity of the mechanism. Such pressure must then be adjusted according to the tangential force to be transmitted, force which depends at the same time on the power transmitted and on the position of the discs.

In existing mechanisms the constant speed cone is subjected to the reaction of balls acting on helicoidal slopes; thus for a given position of the discs the pressure at the points of contact is proportional to the torque and consequently to the power transmitted. But with no heretofore known mechanism is it possible to obtain the correct value of the pressure for the different positions of the discs.

The object of the invention is to provide a mechanism giving the correct value of the pressure for any position of the discs.

The invention is schematically illustrated in the accompanying drawings where

Figure 1:
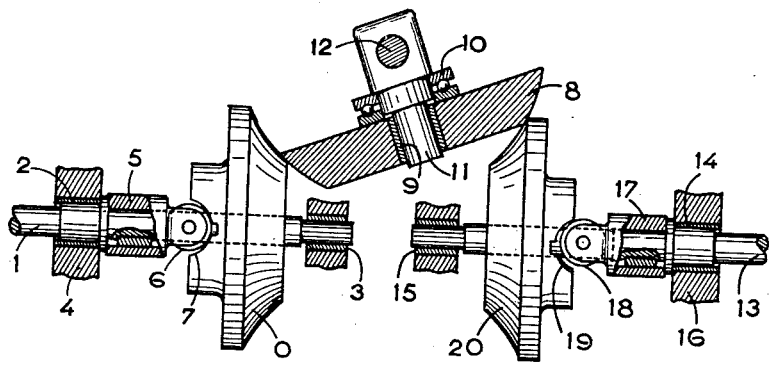
FIG. 1 is an axial section showing the discs inclined to the right.
Figure 2:
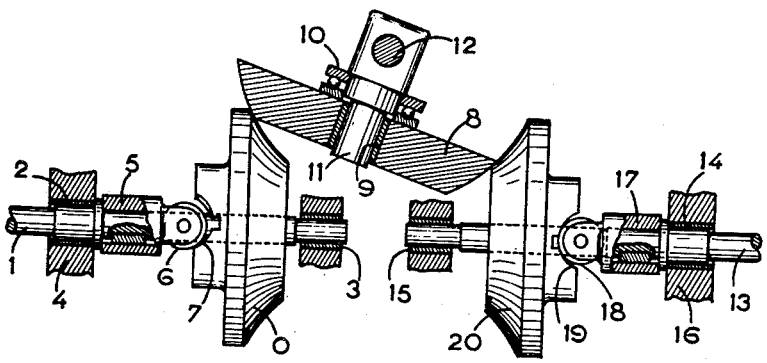
FIG. 2 is an axial section showing the discs inclined to the left.

Referring to the drawings, 1 is the constant speed shaft, turning in bearings 2 and 3, and abutted against a fixed member 4. Fixed on said shaft is a socket 5 supporting two opposing rollers 6, acting on helicoidal non uniform pitch slopes 7 of the driving cone, this cone being mounted on shaft 1, on which it can slide and pivot. These slopes transmit to the cone an axial thrust proportional to the power transmitted and transfer it to the three discs 8, placed at 120°, only one of which is shown. The discs rotate on bearings 9 and 10 mounted on the stud 11 which can be swivelled on the pivot 12 by a mechanism not shown, this movement causing a longitudinal displacement of the driving cone.

The discs make contact on the opposite side with the driven cone 20, similarly mounted on the axle 13 rotating on bearings 14 and 15 and abutted against a shoulder 16. The socket 17 mounted on axle 13 supports two diametrically opposing rollers 18 which contact the non uniform pitch slopes 19 of the driven cone. The swivelling of the discs also causes a longitudinal displacement of the driven cone.

The cones take up a determined longitudinal position for each angular position of the discs, and consequently each roller 6 and each roller 18 contact the corresponding slope at a predetermined point. The value of the thrust necessary to assure the requisite pressure between driving surfaces can be calculated for any position of the discs and from that value the pitch of the slope at that point can be determined.

Figure 3:
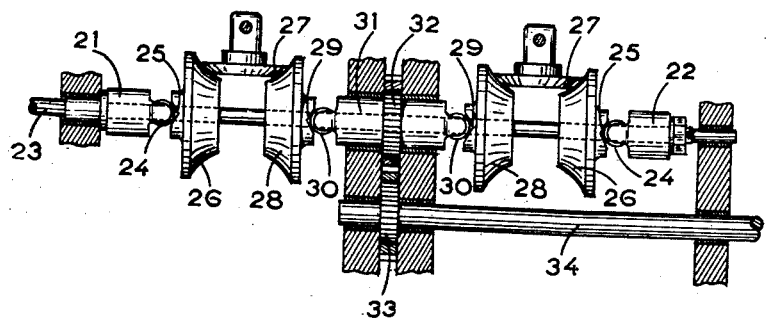
FIG. 3 is an axial section of another arrangement.

In the symmetrical arrangement of FIG. 3 two driving sockets 21 and 22 fixed on the driving shaft 23 support the rollers 24 acting on the helicoidal non uniform pitch slopes 25 of two driving cones 26 which transmit the movement by the swivelling discs 27 to the driven cones 28 whose helicoidal non uniform pitch slopes 29 are applied to the rollers 30 supported by the central socket 31, transmitting the movement to that socket, and from it, by a pair of gears 32 and 33, to the driven shaft 34.

I claim:

In a mechanism comprising two coaxial cones of revolution and, contacting them under pressure, intermediate disks whose axis, situated in substantially radial planes, are pivoted in that plane to displace the points of contact of the cones and the disks on both elements and consequently to provide the variation of speed of the driven cone, the combination of driving and driven cones displacing themselves along their common axis according to the inclination of the axis of the disks, with pressure devices acting without interposition of springs on the cones and comprising helicoidal non uniform pitch slopes and antifriction members contacting these slopes at points, and consequently on inclinations of the slopes, varying with the angular position of the disks and the corresponding positions of the cones, to obtain on each cone for any given position of the disks a longitudinal pressure proportional to the torque that it transmits, the ratio of proportionality varying according to any desired law, with the inclination of the disks.

References Cited in the file of this patent
UNITED STATES PATENTS

| | | |
|---|---|---|
| 1,544,697 | Stoeckicht | July 7, 1925 |
| 1,585,140 | Erban | May 18, 1926 |
| 1,868,676 | Stoeckicht | July 26, 1932 |
| 2,580,669 | Garnier | Jan. 1, 1952 |

FOREIGN PATENTS

| | | |
|---|---|---|
| 75,605 | Sweden | Dec. 19, 1928 |
| 52,473 | France | May 30, 1944 |
| | (1st addition to No. 883,697) | |